United States Patent
Yang et al.

(10) Patent No.: US 7,088,598 B2
(45) Date of Patent: Aug. 8, 2006

(54) POWER-MODE CONTROL CIRCUITRY FOR POWER CONVERTERS

(75) Inventors: Ta-yung Yang, Milpitas, CA (US); Guo-Kiang Hung, Sindian (TW); Chiu Shao Wei, Yanpu (TW)

(73) Assignee: System General Corp., Taipei Hsien (TW)

( * ) Notice: Subject to any disclaimer, the term of this patent is extended or adjusted under 35 U.S.C. 154(b) by 217 days.

(21) Appl. No.: 10/817,775

(22) Filed: Apr. 2, 2004

(65) Prior Publication Data

US 2005/0219870 A1   Oct. 6, 2005

(51) Int. Cl.
*H02M 3/335* (2006.01)
(52) U.S. Cl. .................... 363/21.01; 363/97
(58) Field of Classification Search .............. 363/21, 363/21.01, 21.1, 95, 97, 131

See application file for complete search history.

(56) References Cited

U.S. PATENT DOCUMENTS 5,691,889 A * 11/1997 Bazinet et al. ............... 363/89

* cited by examiner

*Primary Examiner*—Karl Easthom
*Assistant Examiner*—Richard V. Muralidar
(74) *Attorney, Agent, or Firm*—J.C. Patents

(57) ABSTRACT

A power-mode control circuitry is presented for power converters to precisely control a maximum of the output power. The power-mode control circuitry includes a filter to convert a switching current into an average-current signal. A voltage divider attenuates an input voltage of the power converter to an average-voltage signal. A multiplier produces a power signal by multiplying the average-current signal with the average-voltage signal. An error amplifier generates a programming signal by comparing the power signal with a power-level threshold. The programming signal further controls the switching signal for achieving power-mode control.

6 Claims, 12 Drawing Sheets

POWER-MODE CONTROL CIRCUITRY FOR POWER CONVERTERS

BACKGROUND OF THE INVENTION

1. Field of the Invention

The present invention relates to a control mode and more specifically relates to a control mode for power converters.

2. Description of Related Art

Various control modes for power converters have been widely used to regulate an output voltage and an output current. Two common control modes for such regulation are voltage-mode and current-mode. Traditional power converters include an error amplifier in the secondary-side circuit of the power converter to sense the output voltage and the output current. The error amplifier provides a feedback signal to a PWM (pulse width modulation) controller in a primary-side circuit via an optical-coupler.

FIG. 1 shows a traditional power converter. Two error amplifiers 78 and 79 are utilized to produce a feedback signal $V_{FB}$ from an output current $I_O$ and an output voltage $V_O$. The feedback signal $V_{FB}$ will be provided to a PWM controller 80 in the primary-side circuit of the power converter via an optical-coupler 40. The PWM controller 80 generates a switching signal $V_{PWM}$ to switch a transformer 53 by switching a transistor 20. A switching current $I_{IN}$ flowing through the transistor 20 is converted into a current-sense signal $V_S$ via a sense resistor 25($R_S$). The PWM controller 80 includes a SR flip-flop 81, a first comparator 85, a second comparator 84, a NAND gate 83, and an oscillator 82. The oscillator 82 determines a switching frequency and generates a ramp signal $V_{RMP}$.

To implement current-mode control, an adder 87 adds up the ramp signal $V_{RMP}$ with the current-sense signal $V_S$ to produce a sawtooth signal $V_{SAW}$. The first comparator 85 compares the feedback signal $V_{FB}$ with the sawtooth signal $V_{SAW}$ to produce the switching signal $V_{PWM}$. Furthermore, the second comparator 84 compares the current-sense signal $V_S$ with a threshold voltage $V_{TH}$ to control the switching signal $V_{PWM}$ and limit the switching current $I_{IN}$. The switching signal $V_{PWM}$ will regulate the output voltage $V_O$ and/or the output current $I_O$.

In order to protect the power converter and meet the safety requirement, it is necessary to limit the maximum of an output power $P_O$ and the output current $I_O$. Controlling the power delivered from the primary-side to the secondary-side of the transformer controls the output power $P_O$ and the output current $I_O$. The relationship between the output power $P_O$, the output current $I_O$ and the switching current $I_{IN}$ of the power converter can be expressed as:

$$P_O = V_O \times I_O = \eta \times P_{IN} = \eta \times I_{IN} \times V_{IN} \quad (1)$$

$$I_{IN} = \left[\left(\frac{V_{IN}}{L_P} \times \frac{T_{ON}^2}{2T}\right) + \left(I_A \times \frac{T_{ON}}{T}\right)\right] \quad (2)$$

Where $V_O$ is the output voltage; $\eta$ is the efficiency; $I_A$ is the reflected load current; $L_P$ is the primary magnetized inductance; T is the switching period of the switching signal $V_{PWM}$; and $T_{ON}$ is the on-time of the switching signal $V_{PWM}$.

In order to control the output voltage $V_O$, the on-time $T_{ON}$ of the switching signal $V_{PWM}$ is adjusted in response to the feedback signal $V_{FB}$. When the output current $I_O$ increases, the switching current $I_{IN}$ of the transistor 20 will also increase. The switching current $I_{IN}$ of the transistor 20 is converted into the current-sense signal $V_S$. When the current-sense signal $V_S$ exceeds a threshold voltage $V_{TH}$, the on-time $T_{ON}$ of the switching signal $V_{PWM}$ will be restricted to limit a maximum input power $P_{IN\_MAX}$. The maximum input power $P_{IN\_MAX}$ can be expressed as:

$$P_{IN\_MAX} = \left[\frac{1}{2 \times T} \times L_P \times \left(\frac{V_{TH}}{R_S}\right)^2\right] \quad (3)$$

The equations (1) and (3) can be rewritten as:

$$I_O = \frac{P_O}{V_O} = \frac{\eta \times P_{IN\_MAX}}{V_O} = \left\{\frac{\eta \times \left[\frac{1}{2 \times T} \times L_P \times \left(\frac{V_{TH}}{R_S}\right)^2\right]}{V_O}\right\} \quad (4)$$

Since the maximum input power $P_{IN\_MAX}$ is limited, the maximum of the output power $P_O$ can be limited. Therefore, the output voltage $V_O$ will decrease whenever the output current $I_O$ increases. However, a propagation delay time $T_D$ affects the control for the maximum of the output power $P_O$ and the output current $I_O$. If the duration of the propagation delay time $T_D$ is too long, the switching signal $V_{PWM}$ will not be able to accurately control the output current $I_O$.

Referring to FIG. 2, a sense resistor 25($R_S$) converts a switching current $I_{IN}$ into a current-sense signal $V_S$. As shown in FIG. 11, the switching signal $V_{PWM}$ is turned off after the current-sense signal $V_S$ exceeds the threshold voltage $V_{TH}$. The current-sense signal $V_S$ exceeds the threshold voltage $V_{TH}$ at the time $T_{ONX}$. However, the switching signal $V_{PWM}$ is not turned off until after a propagation delay time $T_D$. During the propagation delay time $T_D$, the switching current $I_{IN}$ still continues to increase. This will cause an extra switching current $I_{IN-ex}$ to be generated.

The amplitude of this extra switching current $I_{IN-ex}$ is calculated as equation (5) shows. Referring to equations (5) and (6), the extra switching current $I_{IN-ex}$ causes the maximum input power $P_{IN\_MAX}$ and output current $I_O$ to increase as the input voltage $V_{IN}$ increases.

$$I_{IN-ex} = \left\{\left(\frac{V_{IN}}{L_P} \times \frac{T_D}{2T}\right) + \left[\left(\frac{V_{IN}}{L_P} \times T_{ONX}\right) + I_A\right] \times \frac{T_D}{T}\right\} \quad (5)$$

$$P_{IN\_MAX} = \left[\frac{1}{2 \times T} \times L_P \times \left(\frac{V_{TH}}{R_S} + I_{IN-ex}\right)^2\right] \quad (6)$$

Therefore, the control precision for limiting the maximum of the output power $P_O$ and the output current $I_O$ is compromised by the propagation delay time $T_D$ of the switching signal $V_{PWM}$. In recent commercial applications, power converters having smaller size and higher component density become a major trend. Referring to FIG. 1, the optical-coupler 40 and remaining secondary-side control circuitries add significantly to the size and device count of the power converter. This is a serious drawback of this power converter. However, the secondary circuitries are utilized to limit the output current $I_O$. A precise output current $I_O$ is particularly required for a power converter with a battery load. Therefore, there exists a need for a primary-side power controller with sufficiently precise constant current limiting.

Ideally, constant current output regulation should limit the amplitude of the output current $I_O$ as a constant, at all times.

In practice, the current output deviates from the constant output current limit, depending on the output voltage $V_O$ and the output current $I_O$. Referring to equation (4), when the output voltage $V_O$ decreases, a constant output current $I_O$ can be produced by increasing the switching period T and/or reducing the threshold voltage $V_{TH}$. However, any of several factors can skew the accuracy of this method. Deviation in the primary magnetized inductance $L_P$ and a drifting switching frequency (1/T) could also cause the maximum input power $P_{IN\_MAX}$ and the output current $I_O$ to fluctuate.

Accordingly, the present invention is related to a power-mode control circuitry that can precisely control the maximum output power.

The present invention is also related to a power-mode control circuitry that can precisely regulate the output current in the primary-side circuit of the power converter.

SUMMARY OF THE INVENTION

The power-mode control circuitry according to an embodiment of the present invention includes a filter for converting a switching current into an average-current signal; a voltage divider for generating an average-voltage signal in response to an input voltage of the power converter; a multiplier for producing a power signal by multiplying the average-current signal with the average-voltage signal; a power-level threshold; and an error amplifier. The error amplifier is applied to generate a programming signal by comparing the power signal with the power-level threshold. The programming signal further controls a switching signal for achieving power-mode control.

In an embodiment of the present invention, the programming signal is utilized to compare with a current-sense signal for controlling the switching signal, in which the current-sense signal is converted from the switching current. Therefore, the switching current is adjusted to accomplish a constant power output.

In another embodiment of the present invention, the power-level threshold is generated in proportion to an output voltage of the power converter. The programming signal is compared with the current-sense signal to control the switching signal. Therefore, the switching current is adjusted to accomplish a constant current output.

In another embodiment of the present invention, the power-level threshold is generated in proportion to the output voltage of the power converter. The programming signal is applied to control a switching frequency of the switching signal. Therefore, the switching frequency of the switching signal is adjusted to accomplish a constant current output.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
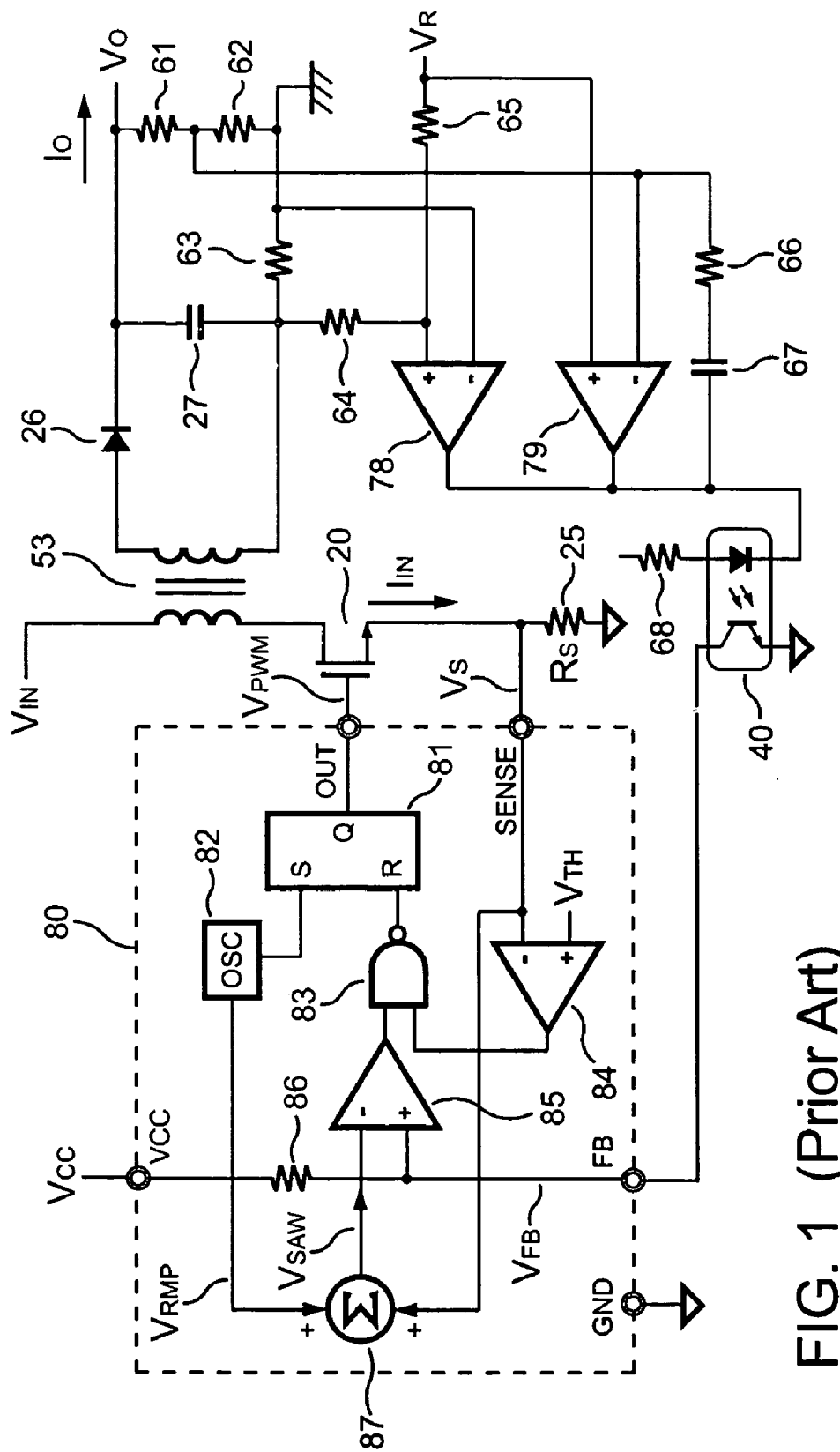
FIG. 1 shows a traditional power converter.
Figure 2:
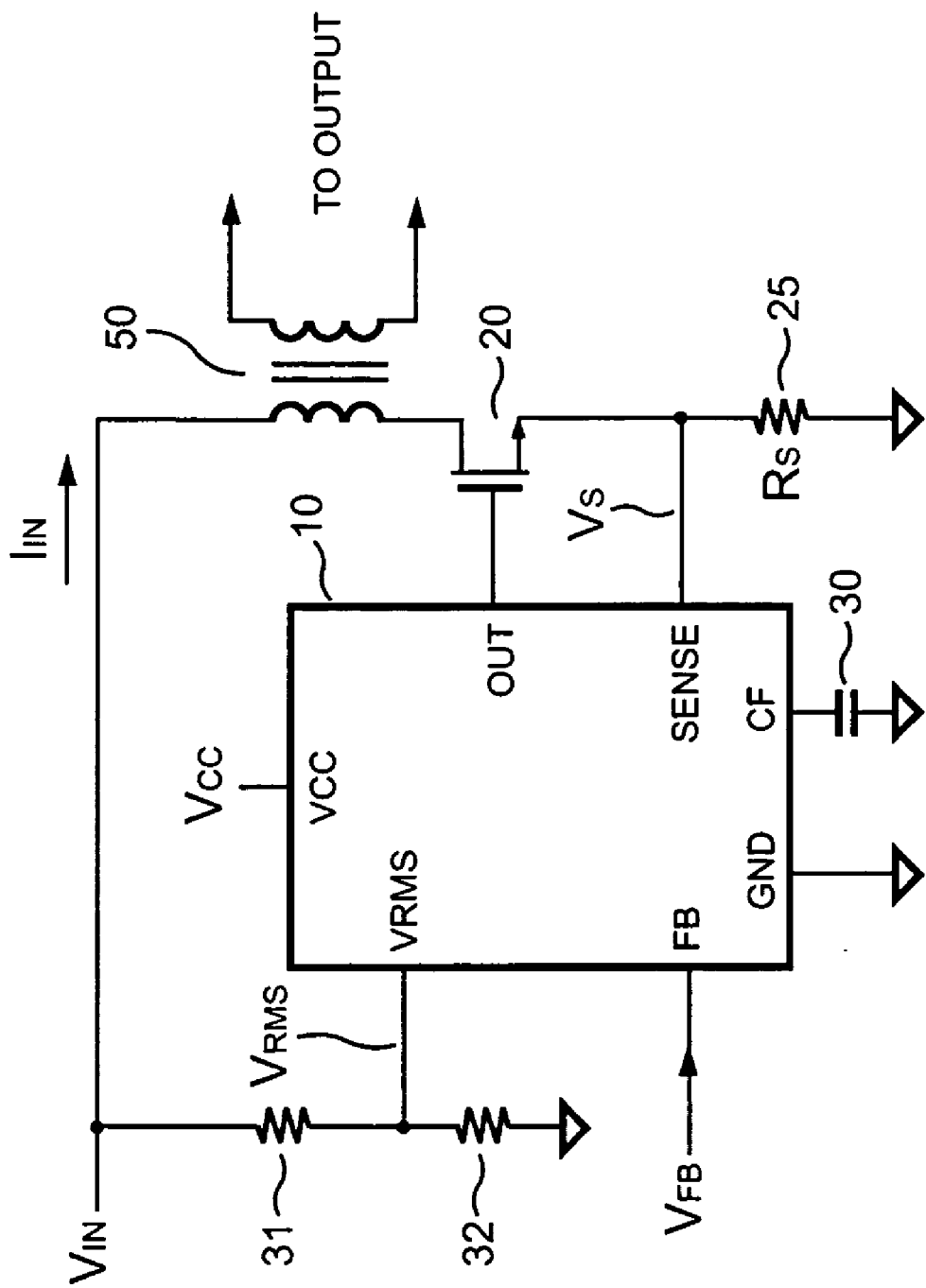
FIG. 2 shows an embodiment of a power-mode controlled power converter according to the present invention.

FIG. 2 shows an embodiment of a power-mode controlled power converter according to the present invention. The power converter according to the present invention includes a PWM controller 10 having a supply terminal VCC, a line-voltage input terminal VRMS, a filter terminal CF, a current-detection terminal SENSE, an output terminal OUT, a ground terminal GND, and a feedback terminal FB. The power converter according to the present invention also includes resistors 31, 32, an integrate-capacitor 30, a sense resistor 25($R_S$), a power transistor 20, a transformer 50. Resistors 31, 32 are connected in series to form a voltage divider, in which the resistor 31 is supplied with an input voltage $V_{IN}$ of the power converter. The resistor 32 is connected to a ground reference. A join of resistors 31 and 32 is connected to the line-voltage input terminal VRMS of the PWM controller 10 for producing an average-voltage signal $V_{RMS}$. The sense resistor 25 connected in series with the power transistor 20 and the transformer 50 is applied to convert a switching current $I_{IN}$ into a current-sense signal $V_S$. The integrate-capacitor 30 is connected to the filter terminal CF of the PWM controller 10. A feedback signal $V_{FB}$ is supplied to the feedback terminal FB for accomplishing feedback loop control.

Figure 4:
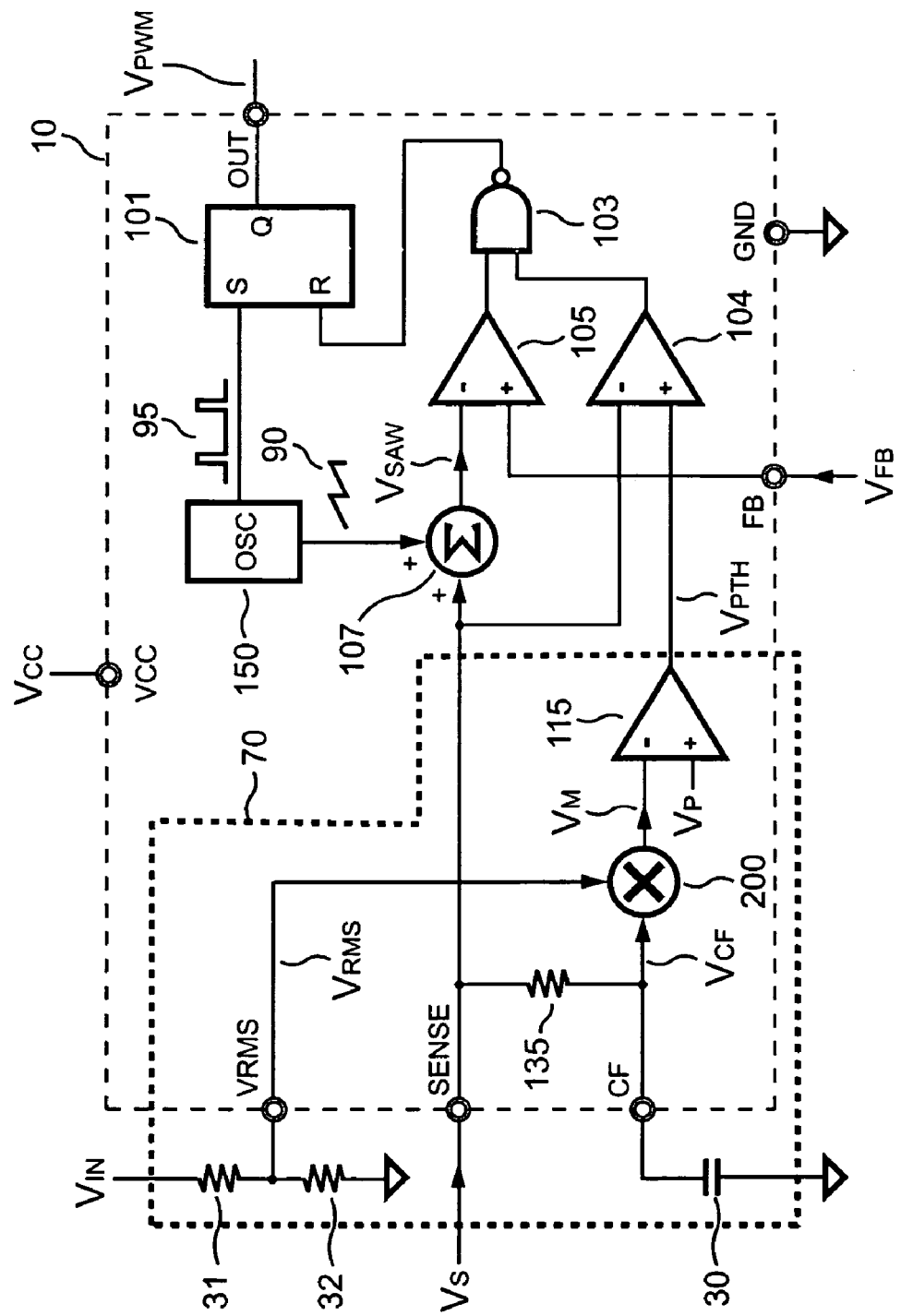
FIG. 4 shows an embodiment of a PWM controller according to the present invention.

FIG. 4 shows an embodiment of the PWM controller 10 according to the present invention. The PWM controller 10 includes a filter resistor 135, a multiplier 200, an error amplifier 115, two comparators 104, 105, a NAND gate 103, an oscillator 150, an adder 107 and a SR flip-flop 101. The filter resistor 135 is connected between the current-detection terminal SENSE and the filter terminal CF. The filter resistor 135 associates with an integrate-capacitor 30 to convert the current-sense signal $V_S$ into an average-current signal $V_{CF}$ at the filter terminal CF. The multiplier 200 multiplies the average-current signal $V_{CF}$ and the average-voltage signal $V_{RMS}$ to generate a power signal $V_M$ at an output of the multiplier 200. The power signal $V_M$ is further supplied to a negative input of the error amplifier 115. A positive input of the error amplifier 115 is supplied with a power-level threshold voltage $V_P$. The error amplifier 115 compares the power-level threshold voltage $V_P$ and the power signal $V_M$ to generate a programming signal $V_{PTH}$ via an output of the error amplifier 115.

The oscillator 150 generates a pulse signal PLS (95) and a ramp signal RMP (90). The pulse signal PLS is used to trigger the SR flip-flop 101. The NAND gate 103 is used to reset the SR flip-flop 101. An output of the SR flip-flop 101 is connected to the output terminal OUT of the PWM controller 10 for generating a switching signal $V_{PWM}$. The NAND gate 103 has two inputs connected to the outputs of the comparator 104 and the comparator 105 respectively. The adder 107 adds up the ramp signal RMP with the current-sense signal $V_S$ to generate a sawtooth signal $V_{SAW}$. The sawtooth signal $V_{SAW}$ is further supplied to a negative input of the comparator 105. A positive input of the comparator 105 is supplied with the feedback signal $V_{FB}$ for feedback loop control. The current-sense signal $V_S$ is supplied to a negative input of the comparator 104. A positive input of the comparator 104 is supplied with the programming signal $V_{PTH}$. The switching signal $V_{PWM}$ is therefore controlled by the feedback signal $V_{FB}$ and the programming signal $V_{PTH}$. Once the current-sense signal $V_S$ exceeds the programming signal $V_{PTH}$, the switching signal $V_{PWM}$ will be turned off immediately to restrict the maximum power delivered from the primary side to the secondary side of the transformer 50. Therefore, the maximum power output is limited in response to the power-level threshold voltage $V_P$, in which the error amplifier 115 provides the gain to precisely control the output power $P_O$.

Figure 3:
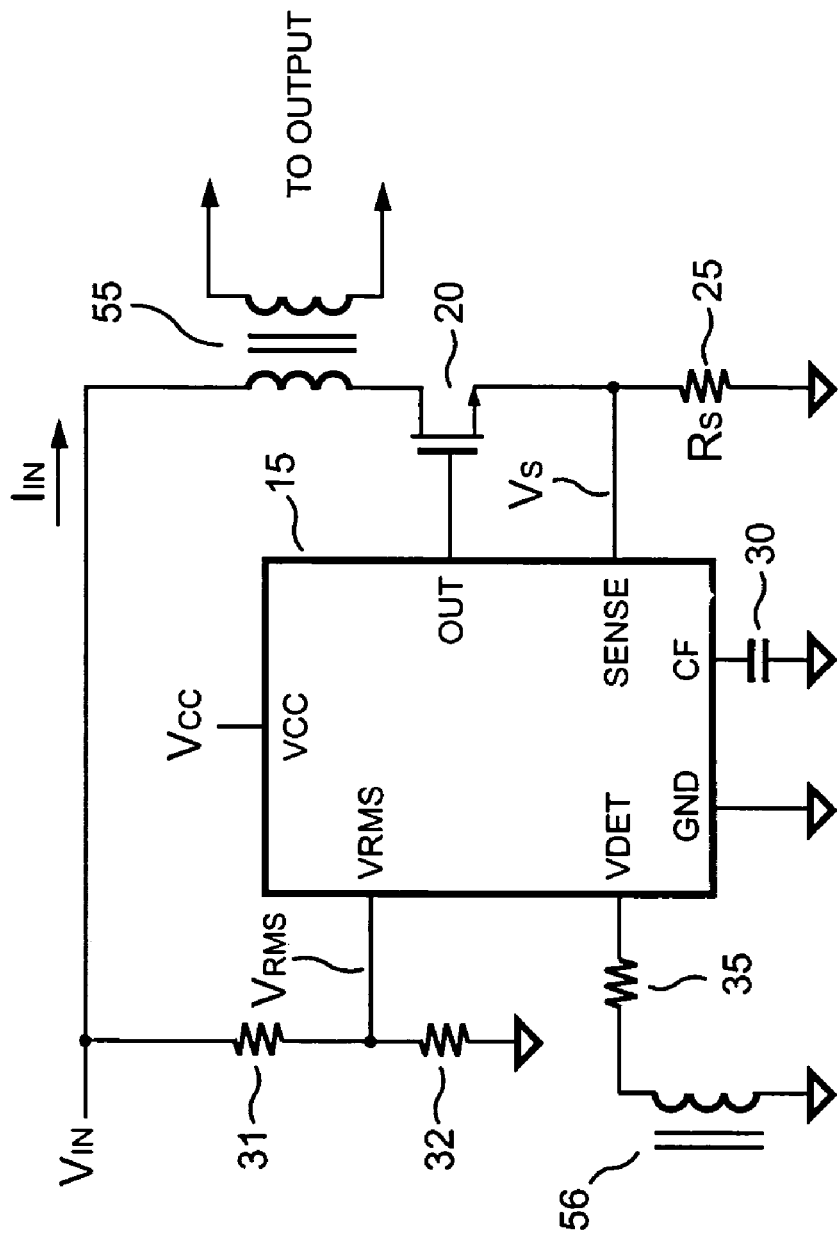
FIG. 3 shows another embodiment of the power-mode controlled power converter according to the present invention.

FIG. 3 shows another embodiment of a power-mode controlled power converter according to the present invention. The power converter according to the present invention includes a PWM controller 15 having a supply terminal VCC, a line-voltage input terminal VRMS, a filter terminal CF, a current-detection terminal SENSE, an output terminal OUT, a ground terminal GND, and a voltage-detection terminal VDET. The power converter according to the present invention includes resistors 31 and 32, an integrate-capacitor 30, a sense resistor 25, a power transistor 20, a transformer 55, a feedback winding 56 and a detection resistor 35. Resistors 31 and 32 are connected in series to form a voltage divider, in which the resistor 31 is supplied with an input voltage $V_{IN}$ of the power converter. The resistor 32 is connected to a ground reference. The join of the resistors 31 and 32 is connected to the line-voltage input terminal VRMS of the PWM controller 15 for producing an average-voltage signal $V_{RMS}$. The sense resistor 25 connected in series with the power transistor 20 and the transformer 55 is applied to convert a switching current $I_{IN}$ into a current-sense signal $V_S$. The integrate-capacitor 30 is connected to the filter terminal CF of the PWM controller 15. The feedback winding 56 provides output voltage information to the voltage-detection terminal VDET through the detection resistor 35 for accomplishing feedback loop control and achieving the constant current output.

Figure 5:
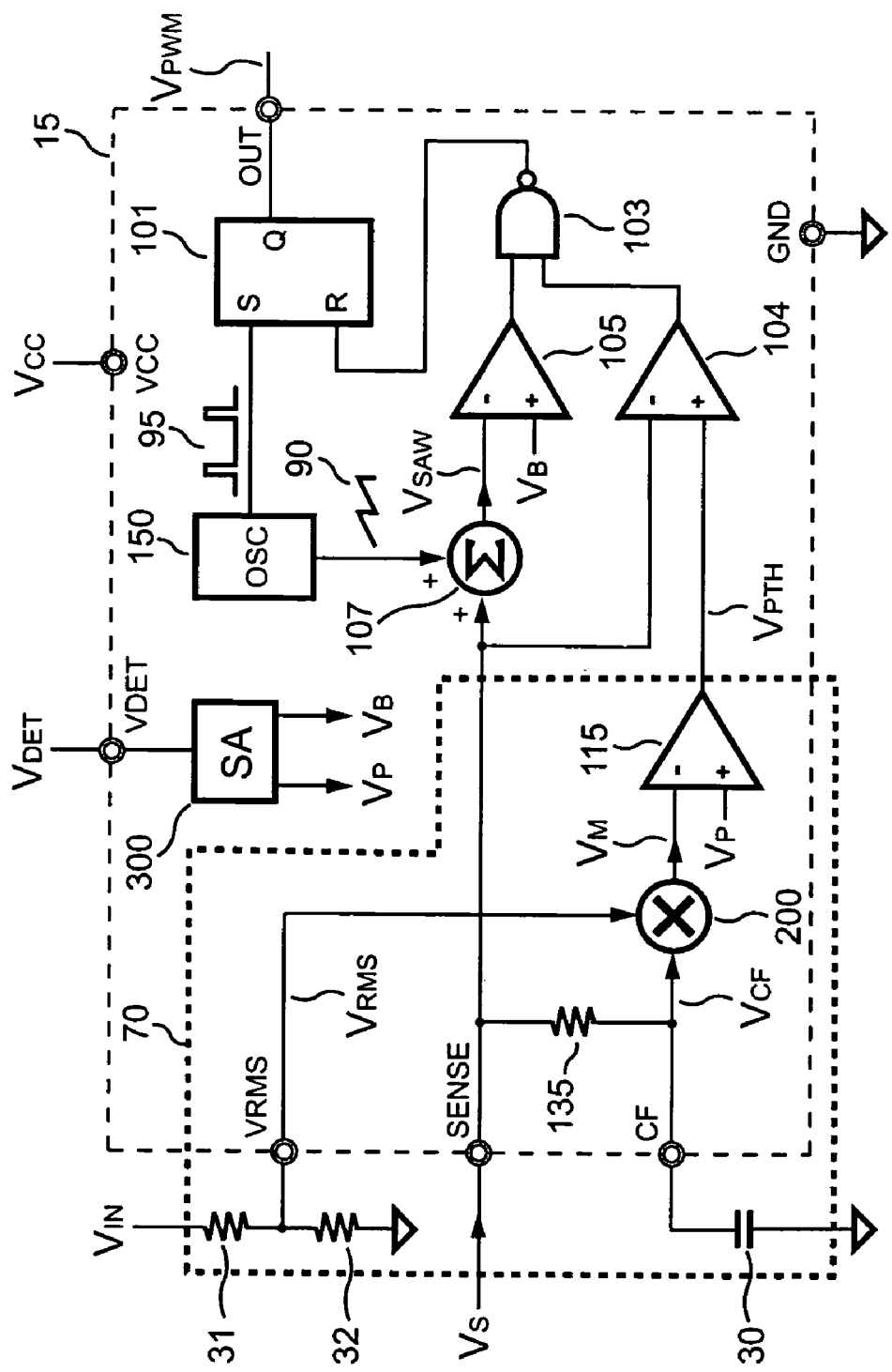
FIG. 5 shows another embodiment of the PWM controller according to the present invention.

FIG. 5 shows an embodiment of the PWM controller 15 according to the present invention. The PWM controller 15 includes a filter resistor 135, a multiplier 200, an error amplifier 115, two comparators 104, 105, a NAND gate 103, an oscillator 150, an adder 107, a SR flip-flop 101 and a sampling-amplifier 300. The sampling-amplifier 300 samples a voltage $V_{DET}$ at the voltage-detection terminal VDET. Since the voltage-detection terminal VDET contains output voltage information, the sampling-amplifier 300 generates a power-level threshold voltage $V_P$ and a sample-feedback signal $V_B$ in proportion to the output voltage $V_O$ of the power converter. The filter resistor 135 that is connected between the current-detection terminal SENSE and the filter terminal CF associates with the integrate-capacitor 30 to convert the current-sense signal $V_S$ into an average-current signal $V_{CF}$ at the filter terminal CF. The multiplier 200 multiplies the average-voltage signal $V_{RMS}$ and the average-current signal $V_{CF}$ for generating a power signal $V_M$ at an output of the multiplier 200. The power signal $V_M$ is further supplied to a negative input of the error amplifier 115. A positive input of the error amplifier 115 is supplied with the power-level threshold $V_P$. An output of the error amplifier 115 supplies a programming signal $V_{PTH}$ in response to the power signal $V_M$ and the power-level threshold voltage $V_P$.

The oscillator 150 generates a pulse signal PLS (95) and a ramp signal RMP (90). The pulse signal PLS is used to trigger the SR flip-flop 101. The NAND gate 103 is used to reset the SR flip-flop 101. The output of the SR flip-flop 101 is connected to the output terminal OUT for generating a switching signal $V_{PWM}$. The NAND gate 103 has two inputs connected to the outputs of the comparator 104 and the comparator 105 respectively. The adder 107 adds up the ramp signal RMP with the current-sense signal $V_S$ to generate a sawtooth signal $V_{SAW}$. The sawtooth signal $V_{SAW}$ is further supplied to a negative input of the comparator 105. A positive input of the comparator 105 is supplied with the sample-feedback signal $V_B$ for feedback loop control. The current-sense signal $V_S$ is supplied to the negative input of the comparator 104. A positive input of the comparator 104 is supplied with the programming signal $V_{PTH}$. Therefore the switching signal $V_{PWM}$ is controlled by the sample-feedback signal $V_B$ and the programming signal $V_{PTH}$. Once the current-sense signal $V_S$ exceeds the programming signal $V_{PTH}$, the switching signal $V_{PWM}$ will be turned off immediately to restrict the maximum power delivered from the primary side to the secondary side of the transformer 55. Since the power-level threshold voltage $V_P$ is in direct proportion to the output voltage $V_O$, the output voltage $V_O$ can program the maximum output power. The constant current output is thus realized.

Figure 10:
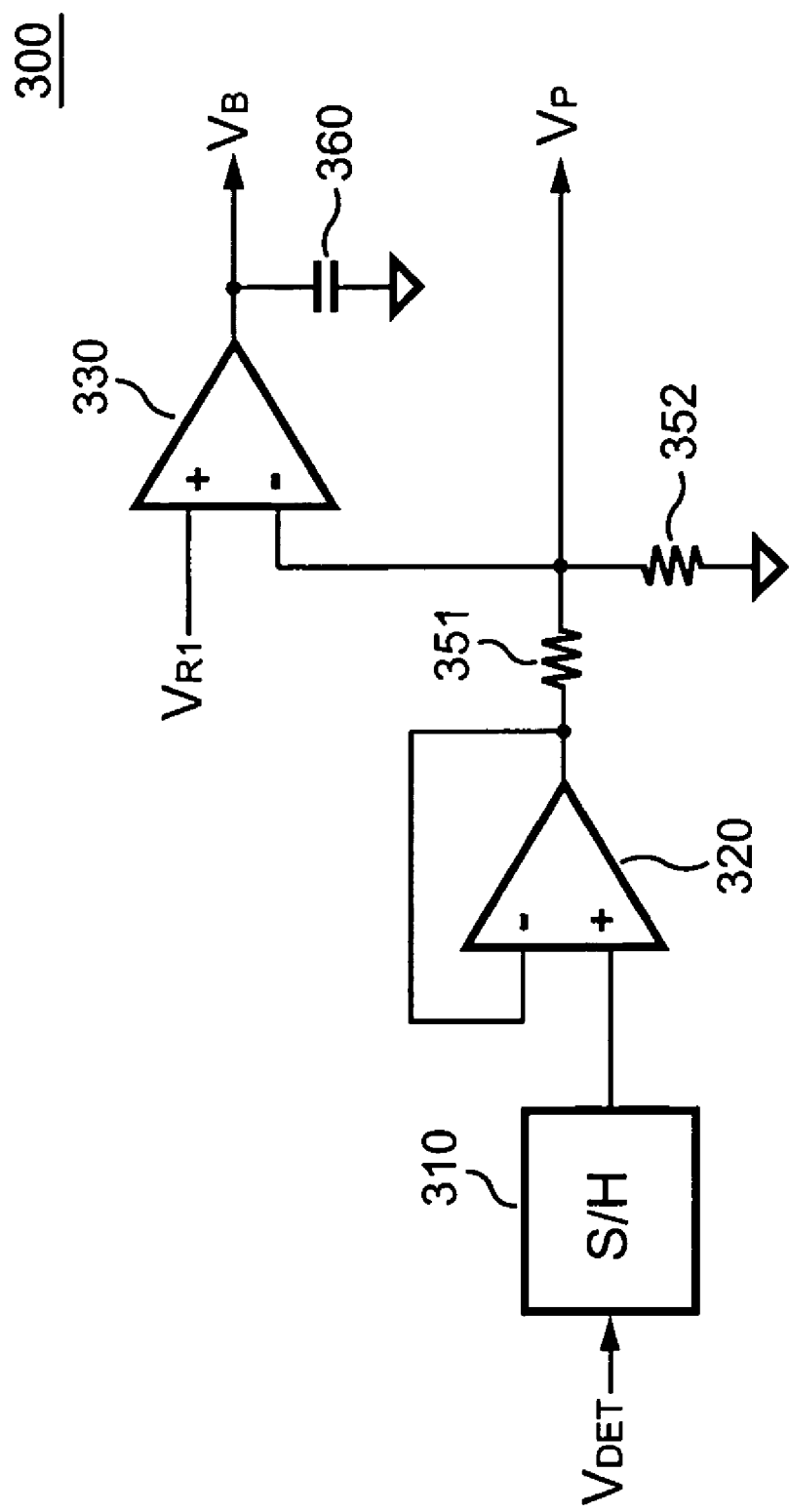
FIG. 10 shows an embodiment of a sampling-amplifier according to the present invention.
Figure 11:
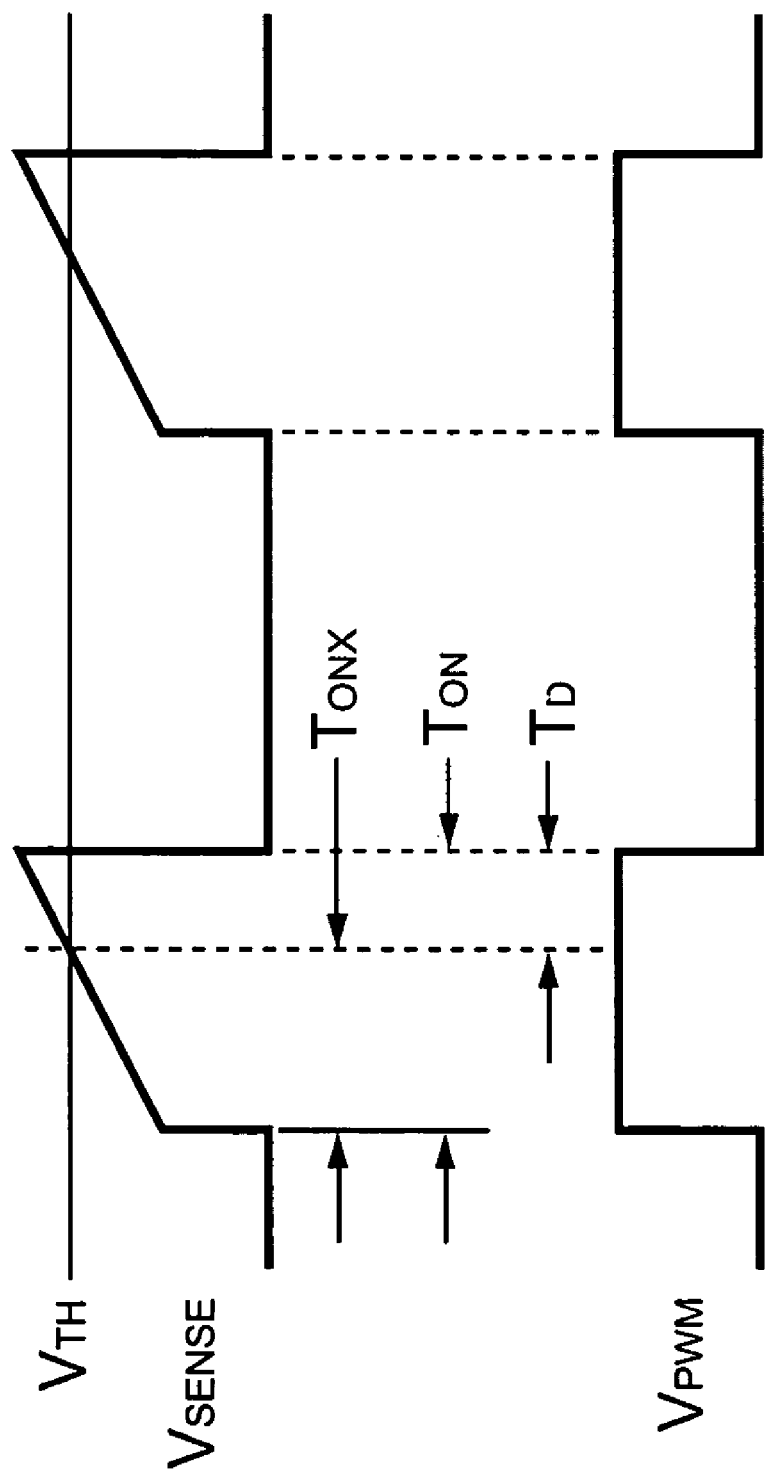
FIG. 11 shows the waveform of a switching signal having a propagation delay time according to an embodiment of the present invention.

FIG. 10 shows an embodiment of the sampling-amplifier 300 according to the present invention. The sampling-amplifier 300 comprises a sample-hold circuit 310, a buffer amplifier 320, two resistors 351, 352, an error amplifier 330, and a capacitor 360. The sample-hold circuit 310 samples the voltage $V_{DET}$ at the voltage-detection terminal VDET and holds the voltage $V_{DET}$ inside. Through the buffer amplifier 320, an output of the sample-hold circuit 310 is connected to the resistor 351. The resistor 351 and the resistor 352 form a voltage divider to generate the power-level threshold voltage $V_P$. The ratio of resistors 351 and 352 determines the magnitude of the constant output current. The power-level threshold voltage $V_P$ is further supplied to a negative input of the error amplifier 330. A reference voltage $V_{R1}$ is supplied to a positive input of the error amplifier 330 to generate the sample-feedback voltage $V_B$ at an output of the error amplifier 330. The capacitor 360 is connected between the output of the error amplifier 330 and the ground reference for frequency compensation.

Figure 6:
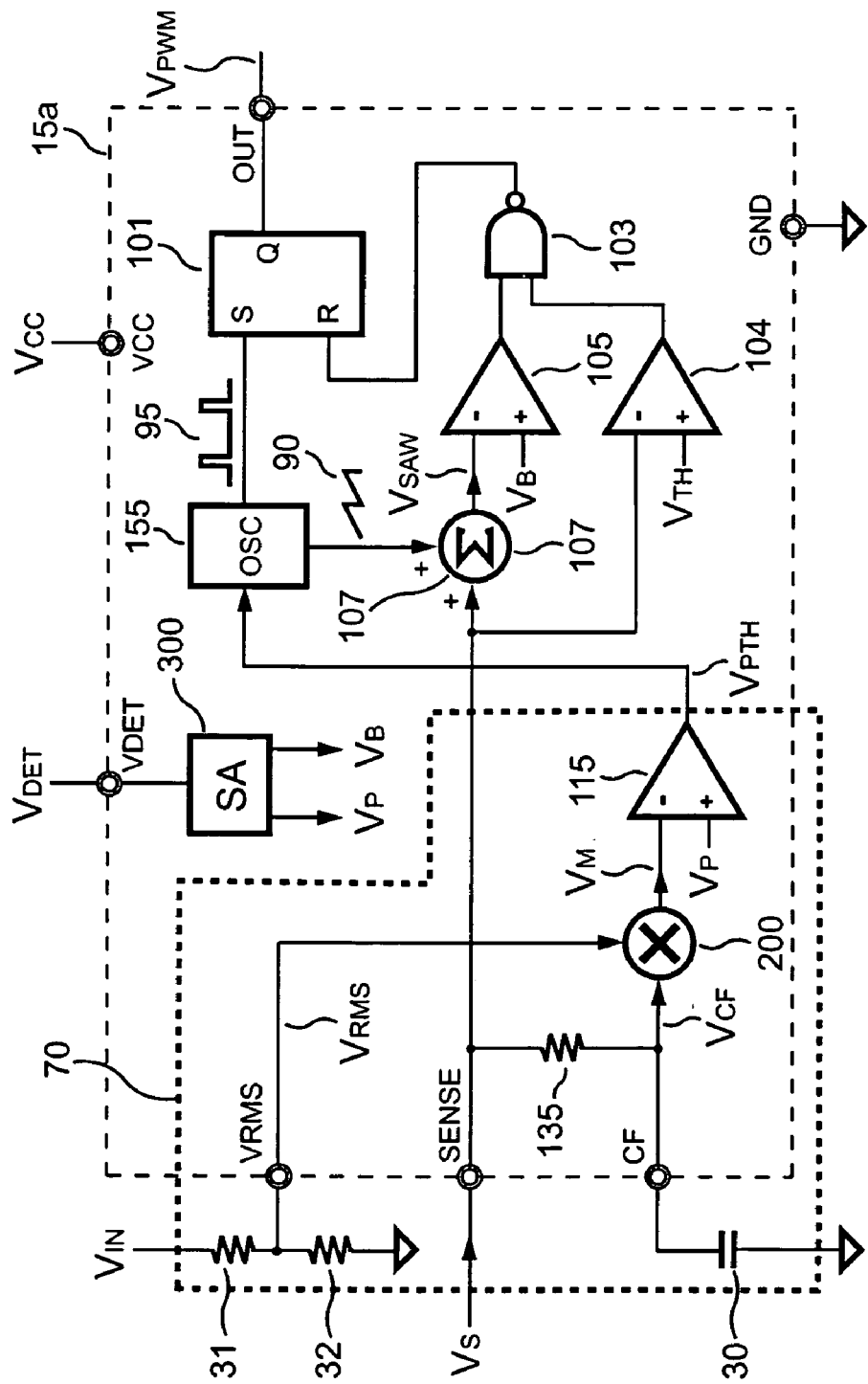
FIG. 6 shows another embodiment of the PWM controller according to the present invention.

FIG. 6 shows another embodiment of a PWM controller 15a according to the present invention. The PWM controller 15a includes a filter resistor 135, a multiplier 200, an error amplifier 115, two comparators 104, 105, a NAND gate 103, an oscillator 155, an adder 107, a SR flip-flop 101, and a sampling-amplifier 300. The sampling-amplifier 300 samples a voltage $V_{DET}$ at the voltage-detection terminal VDET to generate a power-level threshold voltage $V_P$ and a sample-feedback signal $V_B$ in proportion to the output voltage $V_O$ of the power converter. The filter resistor 135 that is connected between the current-detection terminal SENSE and the filter terminal CF associates with the integrated capacitor 30 to convert the current-sense signal $V_S$ into an average-current signal $V_{CF}$ at the filter terminal CF. The multiplier 200 multiplies the average-voltage signal $V_{RMS}$ and the average-current signal $V_{CF}$ for generating a power signal $V_M$ at an output of the multiplier 200. The power signal $V_M$ is supplied to a negative input of the error amplifier 115. A positive input of the error amplifier 115 is supplied with the power-level threshold voltage $V_P$. A programming signal $V_{PTH}$ is produced at an output of the error amplifier 115.

The oscillator 155 generates a pulse signal PLS (95) and a ramp signal RMP (90) in response to the programming signal $V_{PTH}$. The programming signal $V_{PTH}$ also determines the switching frequency of a switching signal $V_{PWM}$ of the power converter. The pulse signal PLS is used to trigger the SR flip-flop 101. The NAND gate 103 is used to reset the SR flip-flop 101. An output of the SR flip-flop 101 is connected to the output terminal OUT for generating the switching signal $V_{PWM}$. The NAND gate 103 has two inputs connected to the outputs of the comparator 104 and the comparator 105 respectively. The adder 107 adds up the ramp signal RMP with the current-sense signal $V_S$ to generate a sawtooth signal $V_{SAW}$. The sawtooth signal $V_{SAW}$ is further supplied to a negative input of the comparator 105. A positive input of the comparator 105 is supplied with the sample-feedback signal $V_B$ for feedback loop control. The current-sense signal $V_S$ is supplied to a negative input of the comparator 104. A threshold voltage $V_{TH}$ is supplied to a positive input of the comparator 104. The switching signal $V_{PWM}$ is therefore controlled by the feedback signal $V_B$ and the threshold voltage $V_{TH}$. Once the power signal $V_M$ exceeds than the power-level threshold voltage $V_P$, the switching frequency of the switching signal $V_{PWM}$ will be decreased to restrict the maximum power delivered from the primary side to the secondary side of transformer. Since the power-level threshold $V_P$ is in direct proportion to the output voltage $V_O$, the output voltage $V_O$ can program the maximum output power. A constant current output is therefore realized.

Figure 7:
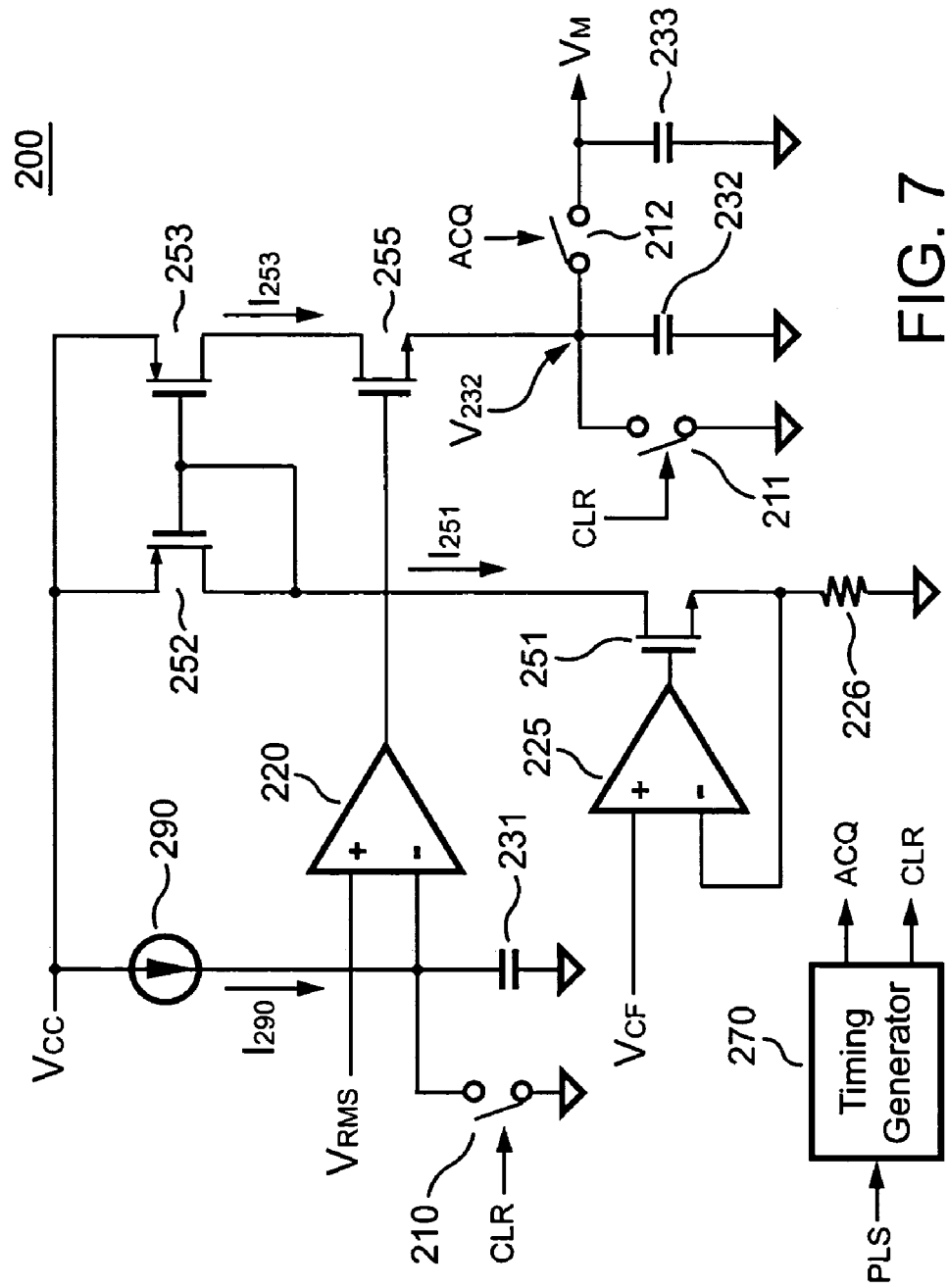
FIG. 7 shows an embodiment of a multiplier according to the present invention.

FIG. 7 shows a preferred embodiment of the multiplier 200 according to the present invention. The multiplier 200 comprises a timing generator 270, a current source 290, a comparator 220, an operational amplifier 225, four transistors 251, 252, 253, and 255; three capacitors 231, 232 and 233; three switches 210, 211, and 212; and a resistor 226.

The timing generator 270 generates timing signals ACQ and CLR in response to the pulse signal PLS. The current source 290, the capacitor 231 and the comparator 220 form a charge-control circuit. The operational amplifier 225, the resistor 226, and the transistor 251 form a V-to-I circuit. The V-to-I circuit generates a current $I_{251}$ in response to the average-current signal $V_{CF}$. Transistors 252 and 253 form a current mirror for mirroring the current $I_{251}$ to a current $I_{253}$. The charge-control circuit controls the transistor 255 for switching on/off the current $I_{253}$. The current $I_{253}$ charges the capacitor 232 to generate a voltage $V_{232}$. The switches 210 and 211 are controlled by the timing signal CLR to discharge the capacitors 231 and 232 respectively. The capacitor 233 holds the power signal $V_M$ of the multiplier 200. The switch 212 is controlled by the timing signal ACQ to switch the voltage $V_{232}$ to the capacitor 233. The average-current signal $V_{CF}$ is supplied to a positive input of the operational amplifier 225. An output of the operational amplifier 225 drives a gate of the transistor 251. The resistor 226 is connected between a source of the transistor 251 and the ground reference. A negative input of the operational amplifier 225 is connected to the source of the transistor 251. The transistor 251 thus generates the current $I_{251}$ in response to the average-current signal $V_{CF}$. The current $I_{251}$ can be expressed as:

$$I_{251} = V_{CF}/R_{226}$$

Where $R_{226}$ is the resistance of the resistor 226.

A drain of the transistor 252 and the gates of transistors 252, 253 are connected to the drain of the transistor 251. The sources of transistors 252, 253 are supplied with a supply voltage $V_{CC}$. A drain of the transistor 253 produces the current $I_{253}$ by mirroring the current $I_{251}$. The average-voltage signal $V_{RMS}$ is connected to a positive input of the comparator 220. The capacitor 231 is connected between a negative input of the comparator 220 and the ground reference. The capacitor 231 is further charged by the current source 290. An output of the comparator 220 drives a gate of the transistor 255. A source of the transistor 255 is connected to the capacitor 232. The switch 212 is connected between the capacitors 232 and 233. The power signal $V_M$ of the multiplier 200 can be expressed as:

$$V_M = \frac{I_{253} \times T_{charge}}{C_{232}}$$

In which, $$I_{253} = k \times \frac{V_{CF}}{R_{226}};$$

$$T_{charge} = \frac{C_{231} \times V_{RMS}}{I_{290}}$$

Therefore, the power signal $V_M$ of the multiplier 200 can also be expressed as, $$V_M = \frac{k}{I_{290} \times R_{226}} \times \frac{C_{231}}{C_{232}} \times V_{CF} \times V_{RMS} \quad (7)$$

$$V_M = K_0 \times V_{CF} \times V_{RMS}$$

Where k is the current mirror ratio of transistors 252 and 253; $C_{231}$, $C_{232}$ are respectively the capacitance of the capacitors 231 and 232; $I_{290}$ is the current of the current source 290; and $K_0$ is a constant.

Figure 8:
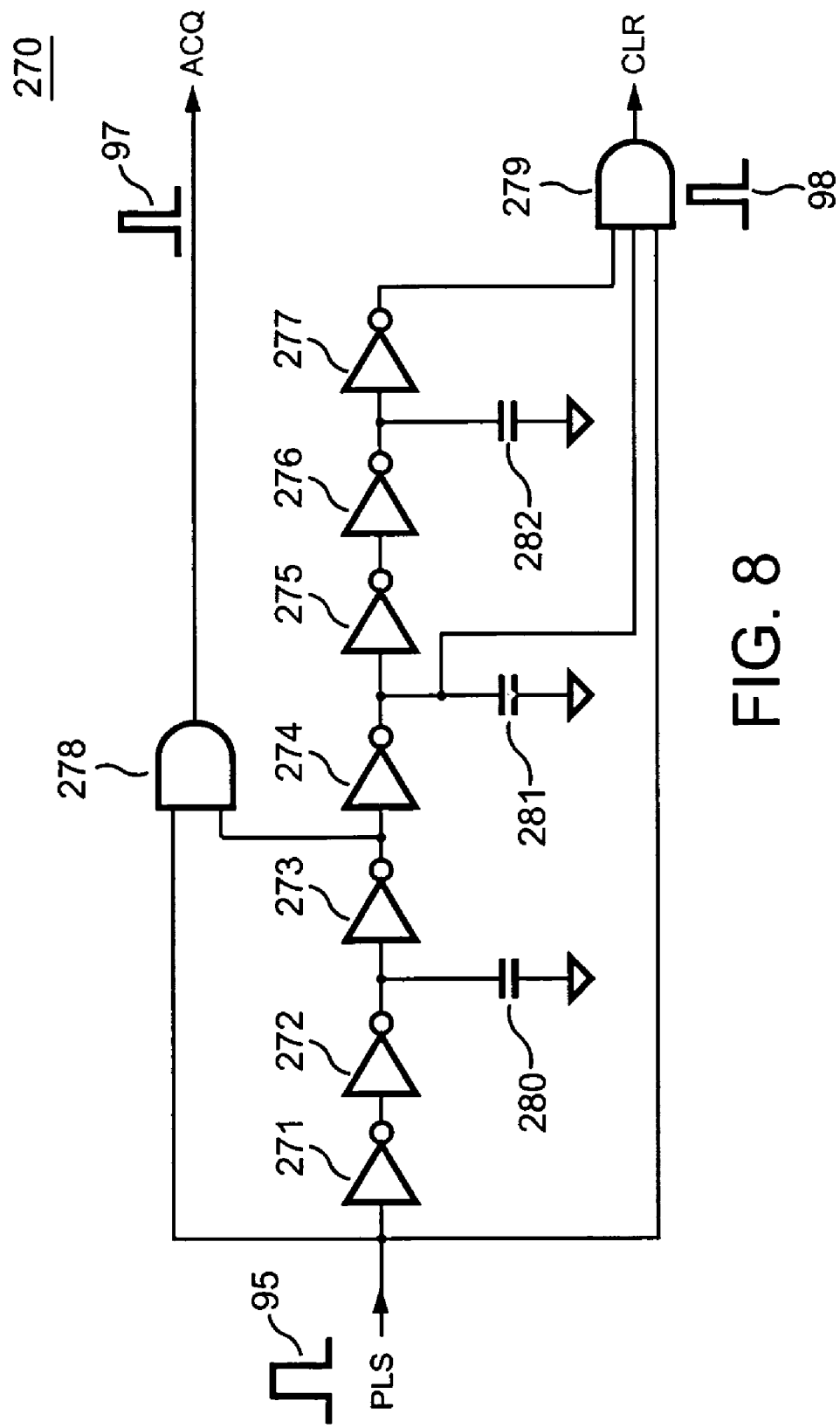
FIG. 8 shows an embodiment of a timing generator according to the present invention.

FIG. 8 shows a preferred embodiment of the timing generator 270 of the multiplier 200 according to the present invention. The timing generator 270 comprises inverters 271, 272, 273, 274, 275, 276, and 277; AND gates 278 and 279; capacitors 280, 281 and 282. The inverters 271, 272, 273, 274, 275, 276 and 277 are connected in series. The pulse signal PLS is supplied to an input of the inverter 271. A first input of the AND gate 278 is supplied with the pulse signal PLS. A second input of the AND gate 278 is connected to an output of the inverter 273. An output of the AND gate 278 generates the timing signal ACQ. A first input of the AND gate 279 is connected to an output of the inverter 277. A second input of the AND gate 279 is connected to an output of the inverter 274. A third input of the AND gate 279 is supplied with the pulse signal PLS. An output of the AND gate 279 generates the timing signal CLR. The capacitor 280 is connected between an output of the inverter 272 and the ground reference. The capacitor 281 is connected between the output of the inverter 274 and the ground reference. The capacitor 282 is connected between an output of the inverter 276 and the ground reference.

Figure 9:
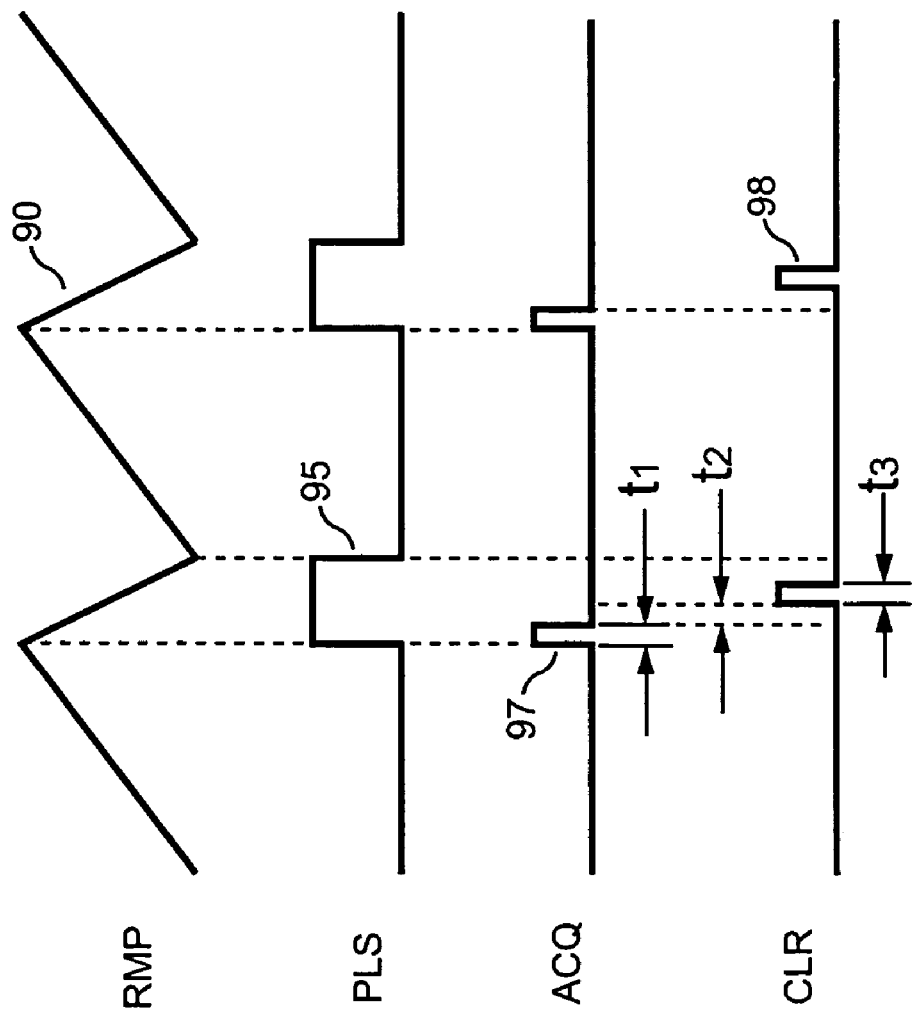
FIG. 9 shows signal waveforms of an oscillator and the timing generator according to an embodiment of the present invention.

FIG. 9 shows the waveforms of the oscillator 150 and the timing generator 270 according to the present invention. A pulse width $t_1$ of the timing signal ACQ is determined by the capacitance of the capacitor 280. A pulse width $t_3$ of the timing signal CLR is determined by the capacitance of the capacitor 282. A delay time $t_2$ inserted after the end of the timing signal ACQ and the start of the timing signal CLR is determined by the capacitance of the capacitor 281.

No matter the output power is controlled by programming the switching current or by adjusting the switching frequency, the power-control loop can provide enough gain to control the output power precisely.

Figure 12:
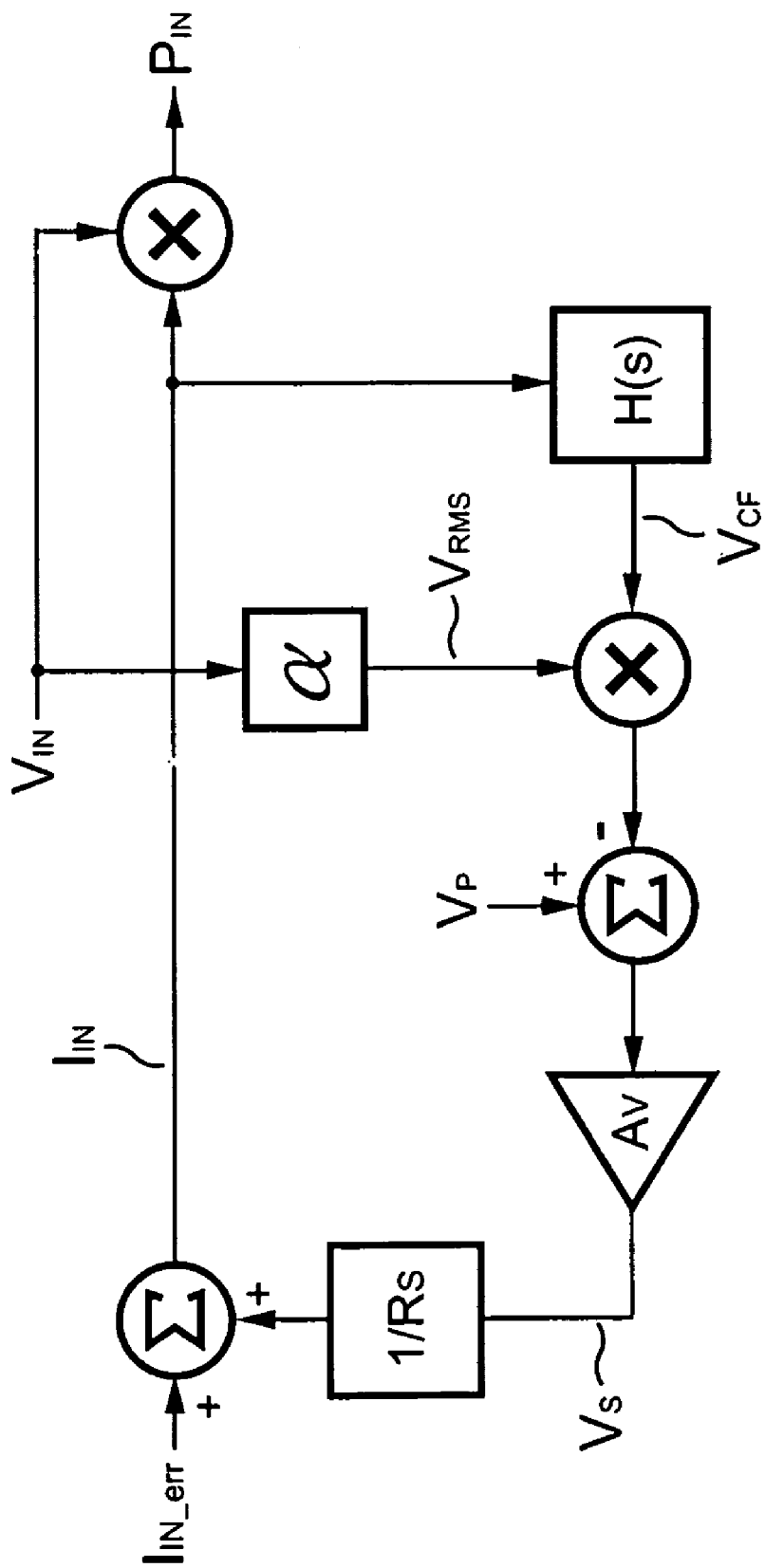
FIG. 12 shows the transfer function block diagram of the power-mode controlled power converter according to an embodiment of the present invention.

FIG. 12 shows the transfer function block diagram of the power-mode controlled power converter. The block H(s) represents the low-pass filter operated by the filter resistor 135 and the integrate-capacitor 30. Av represents the gain of the error amplifier 115. $I_{IN\text{-}err}$ represents the signal distortion due to the circuitry, the propagation delay time $T_D$, and other factors.

As shown in FIG. 12, the switching current $I_{IN}$ can be expressed as:

$$I_{IN} = I_{IN\text{-}err} + \frac{V_S}{R_S} \quad (8)$$

$$I_{IN} = I_{IN\text{-}err} + \frac{1}{R_S} \times \{Av \times V_P - Av \times [\alpha \times V_{IN} \times H(s) \times I_{IN}]\} \quad (9)$$

$$I_{IN} = \frac{I_{IN\text{-}err} + \left(Av \times \frac{V_P}{R_S}\right)}{1 + \frac{Av \times \alpha \times H(s) \times V_{IN}}{R_S}} \quad (10)$$

When Av is much greater than 1, and $V_P/R_S$ is greater than $I_{IN\text{-}err}$, the switching current $I_{IN}$ can be rewritten as:

$$I_{IN} = \frac{V_P}{\alpha \times H(s) \times V_{IN}} \quad (11)$$

Therefore, programming the power-level threshold voltage $V_P$ and the attenuation factor $\alpha$ can precisely control the power delivered from the primary-side circuit to the secondary-side circuit of the power converter. The ratio of the resistance of resistors 31 and 32 determines the attenuation factor $\alpha$ $$P_{IN} = V_{IN} \times I_{IN} = \frac{V_P}{\alpha \times H(s)} \quad (12)$$

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power-mode control circuitry for a power converter, comprising: a filter, for converting a switching current into an average-current signal; a voltage divider, for generating an average-voltage signal in response to an input voltage of the power converter; a multiplier, for producing a power signal by multiplying said average-current signal with said avenge-voltage signal; a power-level threshold; and an error amplifier, for generating a programming signal by comparing said power signal with said power-level threshold, wherein said programming signal is utilized to control said switching signal for achieving power-mode control.

2. The power-mode control circuitry of claim 1, wherein said programming signal is compared with a current-sense signal for controlling said switching signal, wherein said current-sense signal is converted from said switching current, and wherein said switching current is adjusted to accomplish a constant power output.

3. The power-mode control circuitry of claim 1, wherein said power-level threshold is generated in proportion to an output voltage of the power converter, wherein said programming signal is compared with said current-sense signal to control said switching signal, and wherein said switching current is adjusted to accomplish a constant current output.

4. The power-mode control circuitry of claim 1, wherein said power-level threshold is generated in proportion to said output voltage of the power converter, wherein said programming signal is applied to control a switching frequency of said switching signal, and wherein the switching frequency of said switching signal is adjusted to accomplish a constant current output.

5. The power-mode control circuitry of claim 1, wherein said multiplier comprises: a timing generator, for generating a first timing signal and a second timing signal in response to a pulse signal, wherein said pulse signal is generated by an oscillator of a PWM controller of the power converter; a charge-control circuit, formed by a current source, a first capacitor and a comparator, wherein said average-voltage signal is supplied to a positive input of said comparator, wherein said first capacitor is connected between a negative input of said comparator and a ground reference, and wherein said first capacitor is charged by said current source; a V-to-I circuit, formed by an operational amplifier, a first resistor, a first transistor, wherein said V-to-I circuit generates a first current in response to said average-current signal; a current mirror, formed by a first-mirror transistor and a second-mirror transistor, wherein said current mirror generates a mirror current from said first current; a second capacitor, charged by said mirror current, for generating a multiplied voltage; an on/off transistor, controlled by said charge-control circuit for switching on/off said mirror current, wherein an output of said comparator controls a gate of said on/off transistor; a drain of said on/off transistor is driven by said mirror current, and a source of said on/off transistor is connected to said second capacitor, a first switch, controlled by said second timing signal, for discharging said first capacitor; a second switch, controlled by said second timing signal, for discharging said second capacitor; an output capacitor, for holding an output voltage of said multiplier, wherein said average-current signal multiplies with said average-voltage signal to generate said output voltage of said multiplier; an output switch, controlled by said first timing signal to switch said multiplied voltage to said output capacitor, wherein said output switch is connected between said second capacitor and said output capacitor.

6. The power-mode control circuitry of claim 3, further comprising: a sampling amplifier, for receiving a sampled voltage and generating a sample-feedback signal in response to the output voltage of the power converter, wherein said sampled voltage containing output voltage information is used for generating said power-level threshold, and wherein said sample-feedback signal is applied for feedback loop control.

* * * * *